(12) United States Patent
Gomes Leandro et al.

(10) Patent No.: US 9,787,894 B1
(45) Date of Patent: Oct. 10, 2017

(54) AUTOMATIC WHITE BALANCE USING HISTOGRAMS FROM SUBSAMPLED IMAGE

(71) Applicant: Motorola Mobility LLC, Chicago, IL (US)

(72) Inventors: Jorge de Jesus Gomes Leandro, Sao Paulo (BR); Henrique Cunha Dantas, Alagoas (BR); Daniela Radakovic, Park Ridge, IL (US); Cassiano K Casagrande, Sao Paulo (BR); Nicolas Luiz R Veiga, Sao Paulo (BR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/084,829

(22) Filed: Mar. 30, 2016

(51) Int. Cl.
*H04N 5/232* (2006.01)
*G06K 9/62* (2006.01)
*G06T 5/00* (2006.01)
*G06T 5/40* (2006.01)

(52) U.S. Cl.
CPC ....... *H04N 5/23229* (2013.01); *G06K 9/6212* (2013.01); *G06T 5/002* (2013.01); *G06T 5/40* (2013.01)

(58) Field of Classification Search
CPC ....... H04N 5/23229; G06T 5/40; G06T 5/002; G06K 9/6212
See application file for complete search history.

(56) References Cited

PUBLICATIONS

Hui Song, et al., "Auto White Balance Based on the Similarity of Chromaticity Histograms", www.Jofcis.com, Journal of Computational Information Systems 9: 7, 2013, pp. 2557-2564.
Chengqiang Huang, et al., "A Low Power and Low Complexity Automatic White Balance Algorithm for AMOLED Driving Using Histogram Matching", Journal of Display Technology, IEEE, 2013, 8 pages.
Tao Jiang, et al, "Auto White Balance Using the Coincidence of Chromaticity Histograms", Eighth International Conference on Signal Image Technology and Internet Based Systems, IEEE, 2012, pp. 201-208.

*Primary Examiner* — Twyler Haskins
*Assistant Examiner* — Angel L Garces-Rivera
(74) *Attorney, Agent, or Firm* — Amerson Law Firm, PLLC

(57) ABSTRACT

A method includes receiving statistical image data for a set of image data. The statistical image data includes composite intensity metrics for each of a plurality of color channels for each of a plurality of cells of a subsampling grid. A histogram is generated for each of the color channels based on the composite intensity metrics. A gain for each of the color channels is determined based on the histograms. The gains for each of the color channels are applied to the set of image data. The set of image data is stored after applying the gains to generate an image data file.

16 Claims, 5 Drawing Sheets

AUTOMATIC WHITE BALANCE USING HISTOGRAMS FROM SUBSAMPLED IMAGE

BACKGROUND

Field of the Disclosure

The disclosed subject matter relates generally to camera systems and, more particularly, to employing an automatic white balance technique using histograms generated based on subsampled image data.

Description of the Related Art

The sensors employed in digital cameras have difficulty providing an image where white objects actually appear white to a viewer independent of the light source illuminating the scene. For example, the particular ambient light source (e.g., daylight, tungsten lighting, fluorescent lighting, etc.) affects how the image sensor captures the color information. An automatic white balance (AWB) algorithm attempts to compensate for the difference between the estimated lighting source based on the scene composition and a canonical lighting. Typically, AWB techniques implemented in the camera pipeline employ image statistic approximations to try to match the characteristics of the incoming image to known scenarios to perform the balancing. The efficacy of such techniques depends on detailed knowledge of the particular image sensor being employed and often requires extensive tuning. These limitations increase the cost and length of the development cycle for a camera, such as in a mobile telephone device.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

FIGS. 1-5 illustrate example techniques for employing an automatic white balance (AWB) technique using histograms generated based on subsampled image data. In one example, a device receives statistical intensity data for a subsampled image. A histogram is generated for each color channel based on the statistical intensity data. A gain for each color channel is determined based on the histograms.

Figure 1:
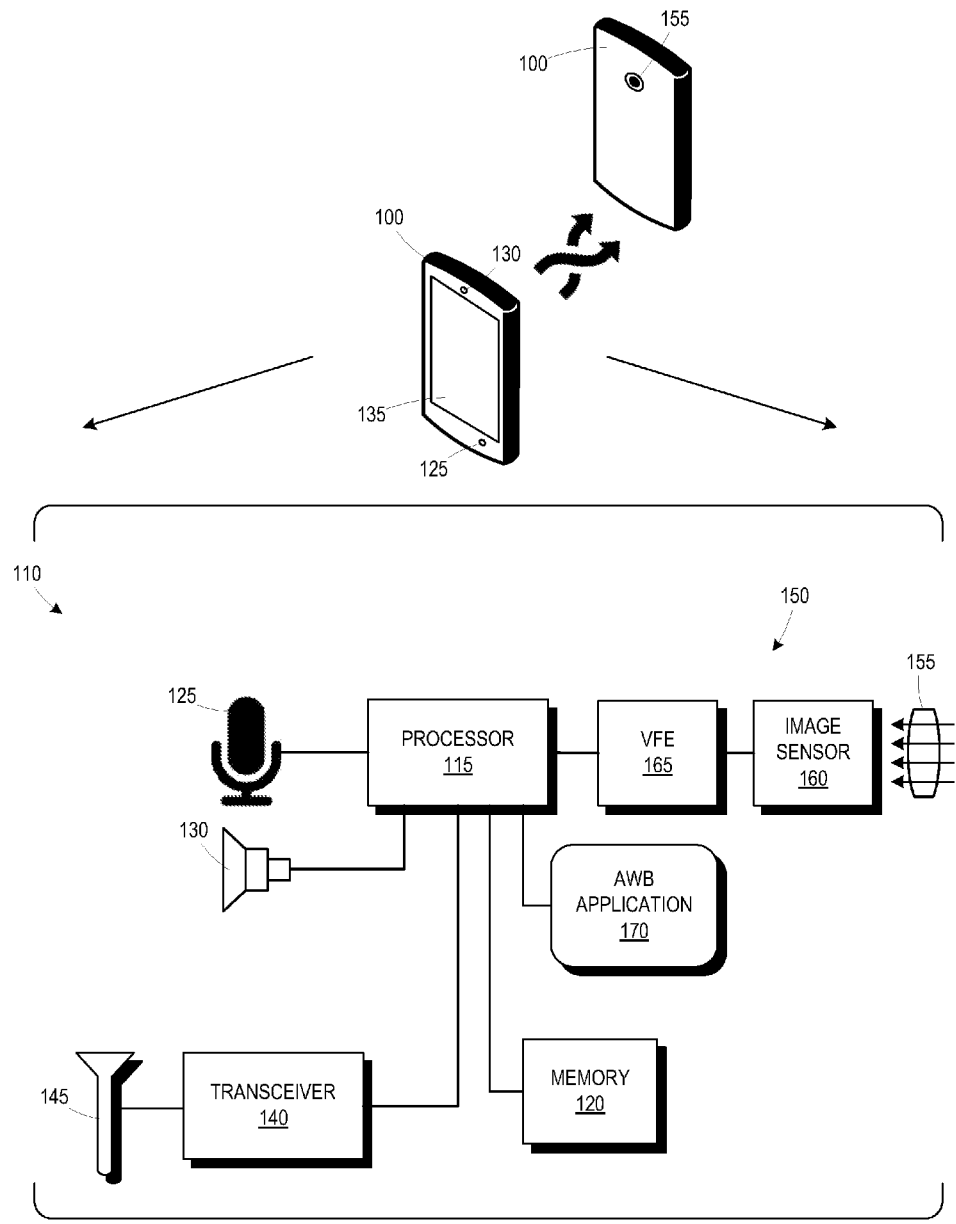
FIG. 1 is a simplified block diagram of a communication device including a camera module to perform automatic white balancing using histograms generated based on subsampled image data, in accordance with some embodiments.

FIG. 1 is a simplistic diagram of a device 100 showing front and back views and a block diagram. The device 100 implements a computing system 110 including, among other things, a processor 115, a memory 120, a microphone 125, a speaker 130, a display 135, a transceiver 140, an antenna 145, and a camera module 150. The memory 120 may be a volatile memory (e.g., DRAM, SRAM) or a non-volatile memory (e.g., ROM, flash memory, etc.), or a combination thereof. The transceiver 140 transmits and receives signals via the antenna 145. The transceiver 140 may include one or more radios for communicating according to different radio access technologies, such as cellular, Wi-Fi, Bluetooth®, ZigBee, etc. In various embodiments, the device 100 may be embodied in handheld or wearable devices, such as a laptop computers, handheld computers, tablet computers, mobile devices, telephones, personal data assistants, music players, game devices, wearable computing devices, cameras, and the like.

The camera module 150 includes a lens 155, an image sensor 160, and a video front end 165 (e.g., a dedicated hardware module including a processor). Although the camera module 150 is illustrated as being part of a device 100 with communications functionality, in some embodiments, the device 100 may include only camera functionality.

In the device 100, the processor 115 may execute instructions stored in the memory 120 and store information in the memory 120, such as the results of the executed instructions. Some embodiments of the processor 115, the memory 120, and the camera module 150 may be configured to implement an automatic white balance (AWB) application 170. The VFE 165 and the processor 115 may implement a camera pipeline 200 illustrated in FIG. 2 and methods 300, 400 shown in FIGS. 3 and 4, respectively, and discussed in greater detail below.

Figure 2:
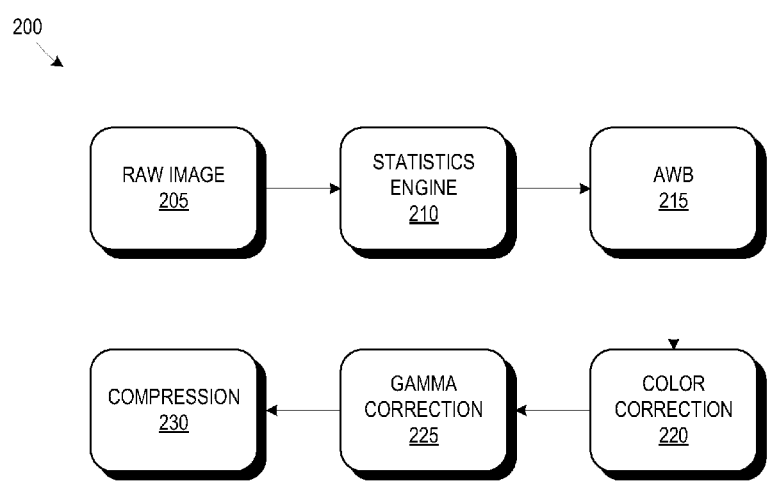
FIG. 2 is a block diagram of a camera pipeline, in accordance with some embodiments.

FIG. 2 is a block diagram of a camera pipeline 200, in accordance with some embodiments. In general, the VFE 165 and the processor 115 define a processor complex that shares the load for processing the data in the camera pipeline 200. However, the distribution of processing functions in the camera pipeline 200 described herein is only one example of how the processing may be distributed, and other distributions may be employed with a greater or lesser number of processing units in the processor complex. The camera pipeline 200 includes a raw image data generation block 205, a statistics block 210, an AWB block 215, a color correction block 220, a gamma correction block 225, and a compression block 230 (e.g., JPEG). The output of the camera pipeline is an image data file that is stored in the memory 120.

In the raw image data generation block 205, the image sensor 160 collects the raw image data. In general, the raw image data includes intensity information for each color channel (e.g., red, green, and blue (RGB)).

The VFE 165 implements the statistics block 210 to generate various statistics using the raw image data. The particular statistics calculated by the statistics block 210 may vary depending on the particular implementation. A given image may be divided into a subsampling grid including cells of pixels. In generating the image statistics data, the statistics block 210 provides one or more metrics for each cell in the subsampling grid. For purposes of performing AWB, the statistics block 210 generates a composite intensity metric for each color channel across each cell of the subsampling grid. Of course, to support other image processing functionalities (e.g., color and gamma correction), the statistics block 210 may generate other statistics not detailed herein. In one embodiment, the composite intensity metric may be an average intensity value for each color channel in a cell, i (i.e., $R_i$, $G_i$, $B_i$). In other embodiments, other composite metrics, such as median intensity value may be used.

The composite intensity metrics for each channel are provided to the AWB block 215. In one embodiment, the AWB application 170 is implemented by the processor 115 to perform processing for the AWB block 215.

Figure 3:
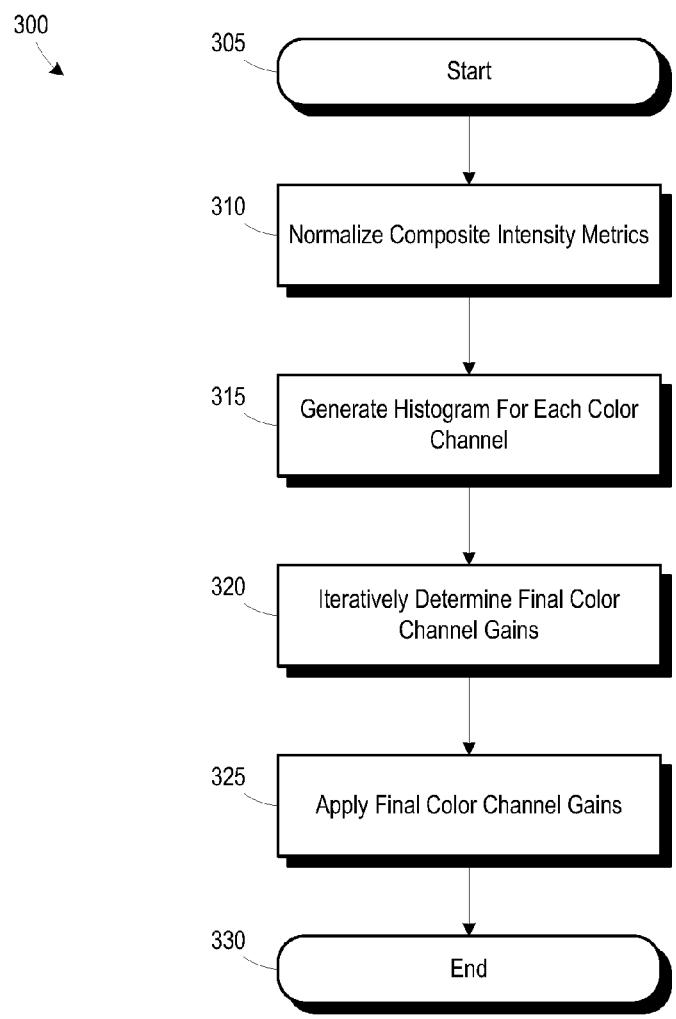
FIG. 3 is a flow diagram of a method for performing automatic white balancing using histograms generated based on subsampled image data, in accordance with some embodiments.

FIG. 3 is a flow diagram of a method 300 for performing automatic white balancing using histograms generated based on subsampled image data, in accordance with some embodiments. The method starts in method block 305. In method block 310, the composite intensity metrics are normalized. In general, normalizing the intensities or determining a ratio between intensities transforms the intensity data to chromaticity data.

In one embodiment, the composite intensity metrics are normalized based on the Euclidian distance over N cells in the subsampling grid, resulting in composite chromaticity metrics:

$$r_i = \frac{R_i}{d_i}, g_i = \frac{G_i}{d_i}, b_i = \frac{B_i}{d_i}$$

$$d_i = \sqrt{R_i^2 + G_i^2 + B_i^2},$$

where $1 \leq i \leq N$.

Figure 5:
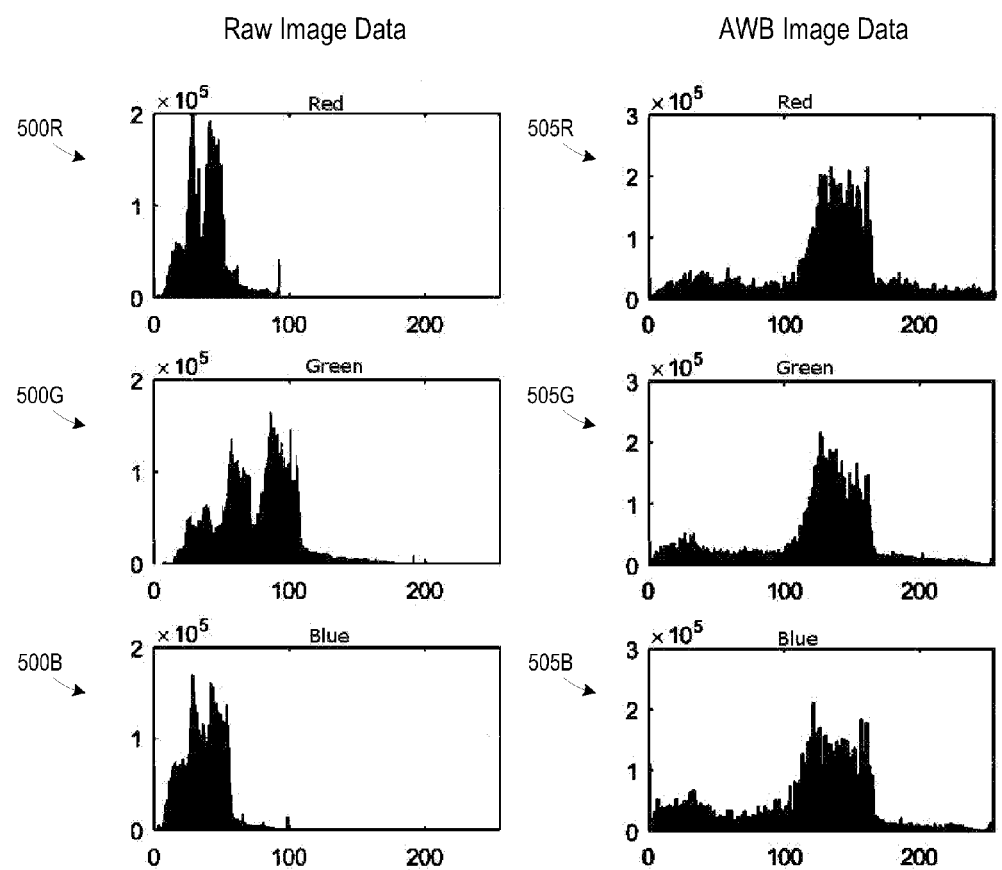
FIG. 5 is a diagram illustrating histograms employed in the AWB processing, in accordance with some embodiments.

In method block 315, a histogram is generated for each color channel. In general, the histogram includes a plurality of bins (e.g., 256) over the normalized intensity (i.e., chromaticity) space. For each color channel, the composite chromaticity metrics (i.e., normalized composite intensity metrics) are mapped to the bins to generate a distribution or histogram. FIG. 5 is a diagram illustrating example raw image histograms 500R, 500G, 500B for each color channel.

In method block 320 an iterative process is performed to determine final color channel gains based on the histograms that optimizes a degree of overlap between the histograms. The iterative process is illustrated in FIG. 4.

Figure 4:
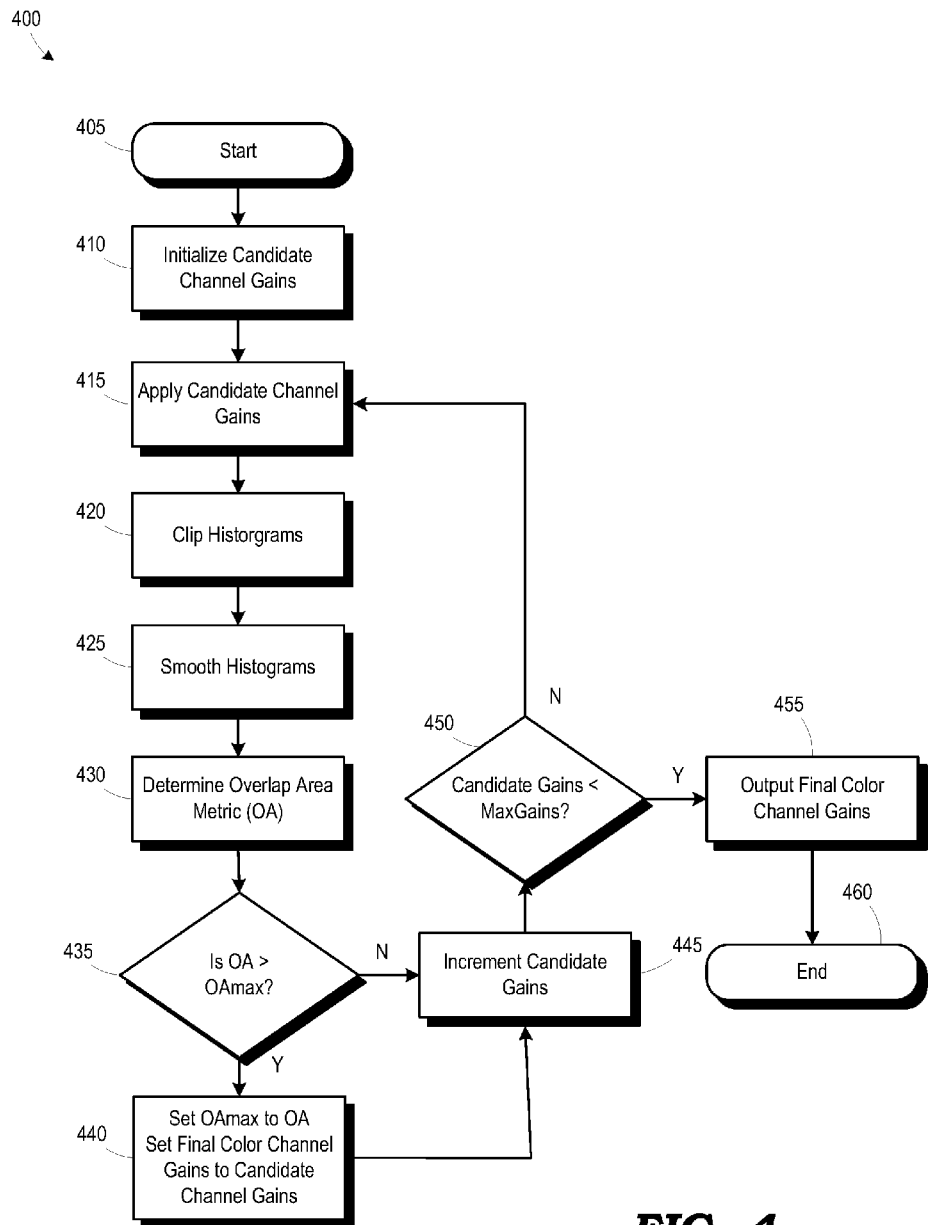
FIG. 4 is a flow diagram of a method for iteratively determining the color channel gains in the method of FIG. 3, in accordance with some embodiments.

FIG. 4 is a flow diagram of a method for iteratively determining the color channel gains in the method 300 of FIG. 3 (method block 320), in accordance with some embodiments. The method 400 starts in method block 405.

In method block 410, candidate channel gains are initialized to a default value. In one embodiment, a predetermined range for the gains may be defined by:

$$gain_c \in [-4,4] \subset R).$$

The candidate channel gains may be initialized to the lower end of the range. In one embodiment, the gain for the green channel is fixed (e.g., at unity) and the gains for the red and blue channels are varied across the predetermined range.

In method block 415, the candidate channel gains are applied to the histograms by multiplying the bin index values by the candidate gains.

In method block 420, the histograms are clipped. Any data points that go beyond the histogram boundaries (e.g., 0 or 256) are mapped to the associated boundary bin.

In method block 425, the histograms are modified by applying a low pass smoothing filter. In some embodiments, the smoothing filter may be a Gaussian filter defined by the convolution product:

$$H_c(k) = \Sigma_j h_c(j) g(k-j+1), \text{ where}$$

$h_c$ is the chromaticity histogram for the channel, c, c=r, g, or b, and $$g(s) = e^{-\frac{s}{2\sigma^2}}$$

is the Gaussian kernel with $\sigma=2$, $s \in [0,30] \subset R$.

In method block 430 an overlap area metric between the histograms is determined:

$$OA = \sum_{i=0}^{256} \min(h_r[i], h_g[i], h_b[i]).$$

In method block 435, the OA is compared to a maximum value of the overlap area metric, OAmax (i.e., from previous iterations). If the current OA is greater than OAmax in method block 435, OAmax is updated and the candidate channel gains are saved as the final gains in method block 440.

If the current OA is not greater than OAmax in method block 435 or after OAmax and the final gains are updated in method block 440, the candidate gains are incremented in method block 445. The incremented candidate gains are compared to the max values defined by the predetermined range in method block 450. If the candidate gains are still in the range in method block 450, the method continues with the next iteration by returning to method block 415. If the range has been covered in method block 450, the final gains are provided as an output for the AWB block 215 in method block 455 and the method terminates in method block 460.

FIG. 5 also illustrates the candidate gains associated with the OAmax applied to the raw image histograms 500R, 500G, 500B for each color channel to generate AWB histograms 510R, 510G, 510B.

Returning to FIG. 3, the final color channel gains are applied to the image data in method block 325 to perform the AWB processing, and the method 300 terminates in method block 330. The final color channel gains may be provided by the AWB application 170 to the VFE 165 for applying to the image data. After applying the AWB gains, color correction block 220, the gamma correction block 225 and compression block 230 (e.g., JPEG) of FIG. 2 are implemented to generate an image data file.

The AWB techniques described herein are computationally efficient so that they may be implemented in the camera pipeline 200 prior to generating the final image file. The AWB techniques do not require knowledge of the particular characteristics of the image sensor 180 or extensive tuning.

In some embodiments, certain aspects of the techniques described above may be implemented by one or more processors of a processing system executing software. The methods 300, 400 described herein may be implemented by executing software on a computing device, such as the processor 115 of FIG. 1, however, such methods are not abstract in that they improve the operation of the device 100 and the user's experience when operating the device 100. Prior to execution, the software instructions may be transferred from a non-transitory computer readable storage medium to a memory, such as the memory 120 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes receiving statistical image data for a set of image data. The statistical image data includes composite intensity metrics for each of a plurality of color channels for each of a plurality of cells of a subsampling grid. A histogram is generated for each of the color channels based on the composite intensity metrics. A gain for each of the color channels is determined based on the histograms. The gains for each of the color channels are applied to the set of image data. The set of image data is stored after applying the gains to generate an image data file.

A device includes an image sensor to generate image data for a plurality of color channels and a processor complex. The processor complex is to implement a video front end to generate statistical image data from the set of image data. The statistical image data includes composite intensity metrics for each of the plurality of color channels for each of a plurality of cells of a sub sampling grid. The processor complex is to implement an automatic white balancing unit to generate a histogram for each of the color channels based on the composite intensity metrics and determine a gain for each of the color channels based on the histograms. The processor complex is to apply the gains for each of the color channels to the set of image data and store the set of image data after applying the gains to generate an image data file.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method, comprising:
    receiving statistical image data for a set of image data, the statistical image data including composite intensity metrics for each of a plurality of color channels for each of a plurality of cells of a subsampling grid;
    generating a histogram for each of the color channels based on the composite intensity metrics;
    determining a gain for each of the color channels based on the histograms that maximizes a degree of overlap between the histograms, wherein determining the gain comprises:
        holding a gain for a selected one of the color channels at unity;
        iteratively varying the gains of the color channels other than the selected one; and
        determining the degree of overlap for each iteration;
    applying the gains for each of the color channels to the set of image data; and
    storing the set of image data after applying the gains to generate an image data file.

2. The method of claim 1, wherein the composite intensity metric comprises an average intensity metric.

3. The method of claim 1, wherein the plurality of color channels comprise a red channel, a green channel, and a blue channel.

4. The method of claim 1, wherein the plurality of color channels comprise a red channel, a green channel, and a blue channel, and the selected channel comprises the green channel.

5. The method of claim 1, further comprising:
    for each iteration:
        determining a candidate gain for each of the color channels other than the selected one;
        applying the candidate gains to the histograms;
        determining the degree of overlap associated with the candidate gains; and
        selecting a set of candidate gains having the highest degree of overlap across all of the iterations as the gains for applying to the set of image data.

6. The method of claim 1, further comprising normalizing the intensity data for each of the cells of the subsampling grid based on the composite intensity metrics for each of the color channels using a Euclidian distance generated based on the composite intensity metrics for each of the color channels.

7. The method of claim 1, wherein generating the histograms comprises clipping values in the histogram.

8. The method of claim 1, wherein generating the histograms comprises applying a smoothing filter to the histogram.

9. A device, comprising:
    an image sensor to generate image data for a plurality of color channels; and
    a processor complex to implement a video front end to generate statistical image data from the set of image data, the statistical image data including composite intensity metrics for each of the plurality of color channels for each of a plurality of cells of a subsampling grid, and an automatic white balancing unit to generate a histogram for each of the color channels based on the composite intensity metrics and determine a gain for each of the color channels based on the histograms that maximizes a degree of overlap between the histograms, wherein the automatic white balancing unit is to hold a gain for a selected one of the color channels at unity, iteratively vary the gains of the color channels other than the selected one, and determining the degree of overlap for each iteration, and wherein the processor complex is to apply the gains for each of the color channels to the set of image data and store the set of image data after applying the gains to generate an image data file.

10. The device of claim 9, wherein the composite intensity metric comprises an average intensity metric.

11. The device of claim 9, wherein the plurality of color channels comprise a red channel, a green channel, and a blue channel.

12. The device of claim 9, wherein the plurality of color channels comprise a red channel, a green channel, and a blue channel, and the selected channel comprises the green channel.

13. The device of claim 9, wherein the automatic white balancing unit is to, for each iteration, determine a candidate gain for each of the color channels other than the selected one, apply the candidate gains to the histograms, determine the degree of overlap associated with the candidate gains, and select a set of candidate gains having the highest degree of overlap across all of the iterations as the gains for applying to the set of image data.

14. The device of claim 9, wherein the automatic white balancing unit is to normalize the intensity data for each of the cells of the subsampling grid based on the composite intensity metrics for each of the color channels using a Euclidian distance generated based on the composite intensity metrics for each of the color channels.

15. The device of claim 9, wherein the automatic white balancing unit is to clip values in the histograms.

16. The device of claim 9, wherein the wherein automatic white balancing unit is to apply a smoothing filter to the histograms.

* * * * *